United States Patent [19]
Overton et al.

[11] Patent Number: 5,274,445
[45] Date of Patent: Dec. 28, 1993

[54] THREE-DIMENSIONAL TESTING OF VIDEO CODES

[75] Inventors: Michael S. Overton, Beaverton; Bruce J. Penney; Douglas C. Stevens, both of Portland, all of Oreg.

[73] Assignee: Tektronix, Inc., Wilsonville, Oreg.

[21] Appl. No.: 663,220

[22] Filed: Mar. 1, 1991

[51] Int. Cl.⁵ .................. H04N 17/00; H04N 17/02; H04N 17/04
[52] U.S. Cl. .................................. 358/139; 358/10; 371/27
[58] Field of Search .............. 358/139, 10, 141, 12, 358/183, 182, 181, 22; 371/20.1, 22, 27, 15.1, 16.1, 16.2, 20.4

[56] References Cited

U.S. PATENT DOCUMENTS

| | | | |
|---|---|---|---|
| 4,322,749 | 3/1982 | Weston | 358/139 |
| 4,554,663 | 11/1985 | Pham Van Cang | 358/139 |
| 4,635,096 | 1/1987 | Morgan | 358/139 |
| 4,855,826 | 8/1989 | Wischermann et al. | 358/139 |
| 4,949,165 | 8/1990 | Riemann et al. | 358/10 |
| 5,038,210 | 8/1991 | Deckelmann et al. | 358/139 |

OTHER PUBLICATIONS

Testing of EDTV and IDTV Systems—Experiences and Recommendations, Alvarez, Roeder, and Teicher, Sep. 17, 1990, IEEE, pp. 787–793.

*Primary Examiner*—James J. Groody
*Assistant Examiner*—Michael H. Lee
*Attorney, Agent, or Firm*—Francis I. Gray

[57] ABSTRACT

A three-dimensional test signal for a video codec is generated by injecting a conventional foreground test signal at a predetermined location as a foreground component within a background test signal as a background component, the background component having a variable complexity. The three-dimensional test signal is input to the video codec and the output of the video codec is measured using conventional measurement instruments. The background component may be a pseudo-random noise signal, a zone plate signal or other variable complexity-type signal, with the foreground component occurring at greater intervals than the neighboring pixels used by the codec compression algorithm. The conventional measurement instruments display only the foreground component with distortions in the video codec caused by the complexity of the background component appearing in the display. A spectral display of the output of the video codec using a zone plate signal as the background component may also be used to characterize the video codec performance.

10 Claims, 5 Drawing Sheets

THREE-DIMENSIONAL TESTING OF VIDEO CODES

BACKGROUND OF THE INVENTION

The present invention relates to testing of video equipment, and more particularly to three-dimensional testing of video codecs to accurately characterize the performance of the codecs.

Television pictures are digitally transmitted over a wide range of channel capacities. Transmitting coders and receiving decoders, commonly referred to as "codecs", are available for many different applications with different picture quality requirements. Broadcast quality codecs commonly use channels with a capacity of 45 Mbits/sec, which are called DS3 links by common carriers, while codecs for video teleconferencing may use channels with data rates of 1.5 Mbits/sec (T1 data links) or even lower. Since a 525 line, 30 frame/sec NTSC television picture requires almost 100 Mbits/sec and the corresponding picture in component format requires over 200 Mbits/sec, data rate reduction or compression factors ranging from 2:1 up to more than 100:1 are used.

Conventional video test signals have not proven adequate for testing the performance of low data rate codecs. The compression algorithms used in these codecs remove redundancy in the picture. Conventional video test signals, such as color bars, linearity, pulse and bar, and multiburst, have no line-to-line variations, and each frame is typically identical. These test signals are vertically and temporally correlated. Therefore the total amount of information in the test signal is much less than the information in a typical television program picture. The compression algorithms perform better on such test signals than on typical program pictures so that more complex test signals are required to more accurately characterize the codecs' performance.

Differential pulse code modulation (DPCM) is commonly used to achieve modest compression ratios. The simplest form of DPCM takes advantage of picture redundancy in a single direction. The codec estimates the current pixel to be the same as its neighbor, taken either horizontally, vertically or temporally. Some codecs use a weighted three-dimensional estimate.

Transform coding together with coefficient thresholding also is used to achieve high quality at low data rates. Transform coding may be combined with motion estimation to take even greater advantage of program picture redundancy.

Codecs commonly include buffers to deal with picture complexity variations. Test signals that are locally complex but globally simple may not fill the buffer. If the test signal does not fill the buffer, the test signal does not test the picture degradations due to channel capacity.

What is desired is a video test signal that provides test pictures with varying amounts of spatial and temporal correlation so that picture distortion may be measured as a function of picture complexity.

SUMMARY OF THE INVENTION

Accordingly the present invention provides a three-dimensional video test signal for video codecs that provides a background signal with varying complexity in the horizontal, vertical and temporal dimensions. The background signal is stored in the memory of a programmable television test signal generator. A conventional television test signal, such as color bars, linearity, pulse and bar, or multiburst, is used as a foreground signal that is inserted into the background signal on specified pixels, lines, fields and/or frames to create the three-dimensional test signal with controlled correlation along any combination of axes. The three-dimensional test signal is input to the codec, and the output of the codec is input to a conventional video measurement test instrument, such as a waveform monitor, vectorscope, digital storage oscilloscope or spectrum analyzer. Averaging techniques may be used in the measurement instrument to reduce the background component of the three-dimensional test signal so that the foreground component is readily observable on the measurement instrument, or the measurement instrument may be triggered for display only when the foreground component is present. By comparing the resulting foreground component with the input foreground component, or observing the spectrum response of the output compared to an expected response to the three-dimensional test signal, the operation of the codec may be characterized.

The objects, advantages and other novel features of the present invention are apparent from the following detailed description when read in conjunction with the appended claims and attached drawing.

DESCRIPTION OF THE PREFERRED EMBODIMENT

Figure 1:
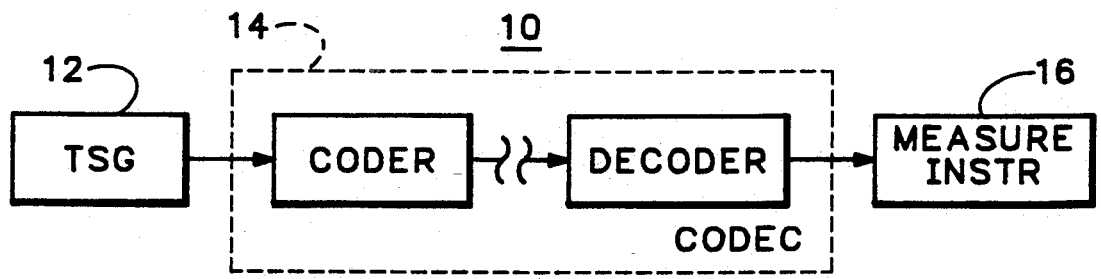
FIG. 1 is a block diagram of a system for testing a video codec according to the present invention.
Figure 2:
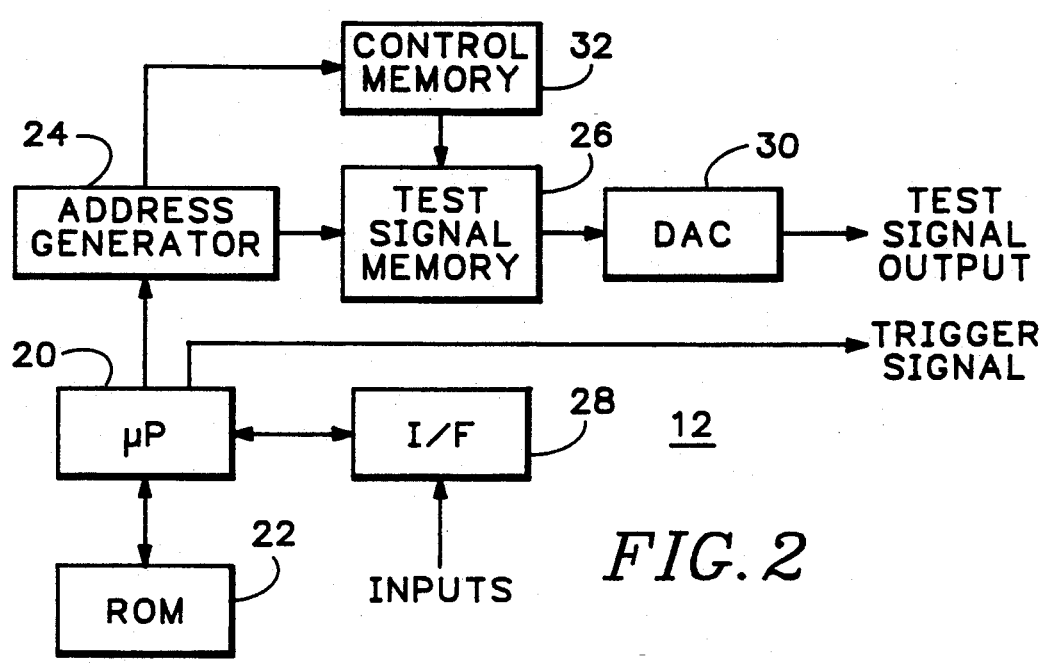
FIG. 2 is a block diagram of a typical programmable test signal generator for generating a three-dimensional test signal according to the present invention.

Referring now to FIG. 1 a test system 10 is shown that has a programmable test signal generator 12 to provide appropriate video test signals. The output of the generator 12 is input to the device under test 14, such as a codec having a coder and decoder coupled by a transmission medium, and the output of the device under test is input to a measurement instrument 16, such as a waveform monitor, a vectorscope, a video measurement test set, a digital storage oscilloscope, or a spectrum analyzer. The programmable test signal generator 12 is shown in greater detail in FIG. 2. A microprocessor 20, with associated program memory 22, includes an address generator 24 for accessing a test signal memory 26. An operator interacts with the microprocessor 20 via an interface unit 28, such as a front panel keyboard or the like, to select the desired test signal from the test signal memory 26. The selected test signal is synthesized, as is well known in the art, and passed through a digital to analog converter 30 to produce the video test signal for input to the device under test 14.

The desired three-dimensional test signal has a background component and a foreground component. The background component is designed to provide sufficient data variation in all dimensions in order to push the capacity of the device under test 14, or codec, to its limits. Picture complexity is the amount of correlation along any axis between two areas of a picture, or the amount of correlation between coefficients in a two-dimensional fast Fourier Transform within a defined area of the picture. The less the correlation, the greater the picture complexity. Such picture complexity is affected both by the bandwidth and amplitude of the test signal representing the picture.

Figure 3:
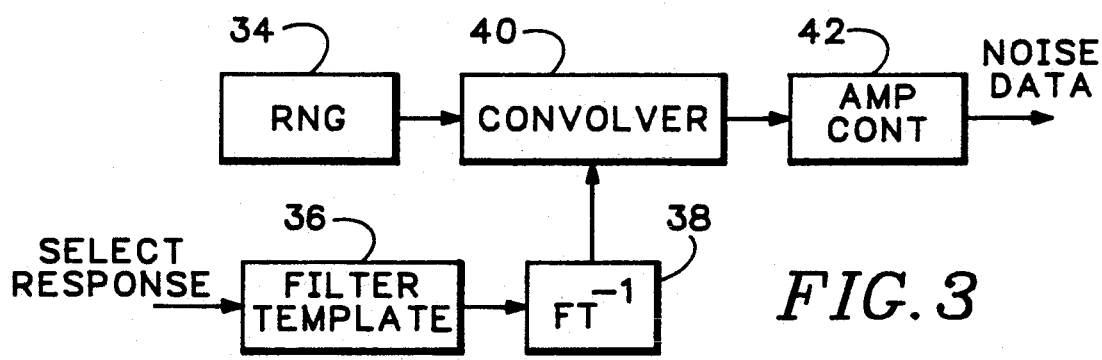
FIG. 3 is a block diagram of a background signal generator according to the present invention.

A pseudo-random noise signal may be generated as the background component with controlled correlation in any direction. As shown in FIG. 3 sequences of random numbers are calculated by a random signal generator 34 and taken as data points representing pixel-by-pixel data points for a sampled television line of white noise signal. A noise filter template 36 determines the desired system bandwidth according to a select frequency response command. If an analog signal could be perfectly reconstructed from these data points, the analog signal would have energy to half the sampling frequency, or 7.16 MHz in the case of sampling at four times the NTSC color subcarrier frequency. Since codecs to be tested typically do not have pass signals above about 5 MHz, it is desirable to limit the noise bandwidth. This can be done either in software or in hardware by inputting the desired bandwidth response from the noise filter template 36 to an inverse Fourier transform 38, and then combining the number sequences from the random number generator with the inverse bandwidth response in a convolver 40. Convolving in the time domain is equivalent to multiplying in the frequency domain. The resulting data points from the convolver 40 are input to an amplitude control circuit 42 to multiply the convolver output by a selected constant to produce the noise output signal. The amplitude of the noise output signal also may be established by selecting the range of the random number generator 34. The resulting band limited noise is then sent to the test signal memory 26 of the video test signal generator 12 for storage as the background component.

Alternatively the pseudo-random noise signal may be generated by an analog video noise generator and either switched with the desired foreground component from the test signal generator 12 to produce the three-dimensional test signal directly for input to the device under test 14, or digitized for storage in the test signal memory 26 of the test signal generator.

Each set of data points represents a different television line. Since codecs take advantage of correlation in only a limited neighborhood around any particular pixel, repetition, i.e., correlation, of the pseudo-random noise signal with a period greater than the dimension of the neighborhood does not impair the use of the test signal. Therefore by properly addressing the test signal memory 26 only a small number of television lines need be stored in the test signal generator 12. Since noise amplitude and noise bandwidth determine the background picture complexity, it is useful to select these parameters when testing the codec.

Background components with a number of different amplitudes and bandwidths may be stored in the test signal generator memory 26 and selected by the user. Also the pseudo-random noise signal may be created by an analog video noise generator and then digitized for storage in the test signal generator 12. Further the bandwidth control may also be implemented with a two or three dimensional convolver 40 to specifiy a two or three dimensional spatio-temporal bandwidth for specialized testing applications. Such an expansion to additional dimensions introduces more hardware/software complexity.

Alternatively a zone plate signal, which provides differing amounts of picture complexity, may be used as the background component. The zone plate signal may be a function of any combination of the horizontal, vertical and temporal axes. Any complex signal that provides varying degrees of complexity, including even synthetic texture signals, may be used as the background component.

A conventional television test signal, such as color, bars, linearity, pulse and bar, or multiburst, may be used as the foreground component. Digital test signal generators 12 typically have both the test signal memory 26 and a control memory 32. The control memory 32 is used to select which test signal is output from the test signal memory 26 in response to operator selection. The control memory 32 may be programmed to select the foreground component for a group of pixels horizontally, vertically and/or temporally either along an arbitrary axis or in a three-dimensional region along the arbitrary axis. Thus the foreground component may be inserted into the background component on specified pixels, lines, fields and/or frames to create the three-dimensional test signal with correlation along any combination of axes. The foreground component may be rotated to other axes where it is necessary to eliminate horizontal correlation in the conventional foreground component. Alternatively a test signal with little pixel-to-pixel correlation, such as a windowed $\sin(x)/x$ or chirp signal, may be used as the foreground component. The microprocessor 20 controls the address generator 24 to address the test signal memory 26 and the control memory 32 so that the output from the test signal memory provides the desired three-dimensional test signal, and outputs a trigger signal when the foreground component is inserted into the background component.

The foreground component is measured using familiar television test instruments, such as a waveform monitor, vectorscope or the like. If the field repetition rate of the foreground component is reasonably high, the line selector of the measurement instrument 16 may be used to view the combined test signal output from the device under test 14. If the field repetition rate is low, a digital storage oscilloscope may be used as the measurement instrument 16 to give a more usable display.

The pseudo-random background component may be generated with a constant mean value averaged over a number of pixels, lines or fields that is only slightly greater than the neighborhood used by the compression algorithm of the codec being tested. An instrument, such as the VM 700 Video Measurement Set manufactured by Tektronix, Inc. of Beaverton, Oreg., United States of America, digitizes the video signal from the device under test 14 and provides the capability of averaging over a number of sampled signals. The foreground component may be viewed by averaging the pseudo-random background component or by selecting in response to the trigger signal the pixels, lines or fields on which the foreground component appears. Rejection of the background component by averaging requires that either a very large number of samples be averaged, or else that the background component be chosen such that it sums to a constant over a selected number of fields.

Figure 5:
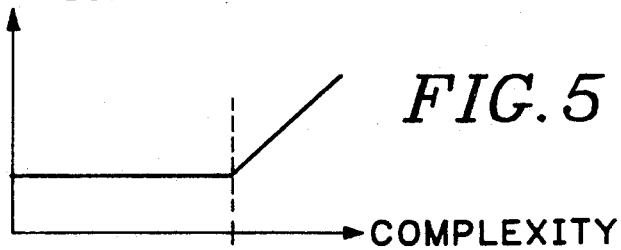
FIG. 5 illustrates a complexity characteristic for a codec tested according to the present invention.
Figure 4A:
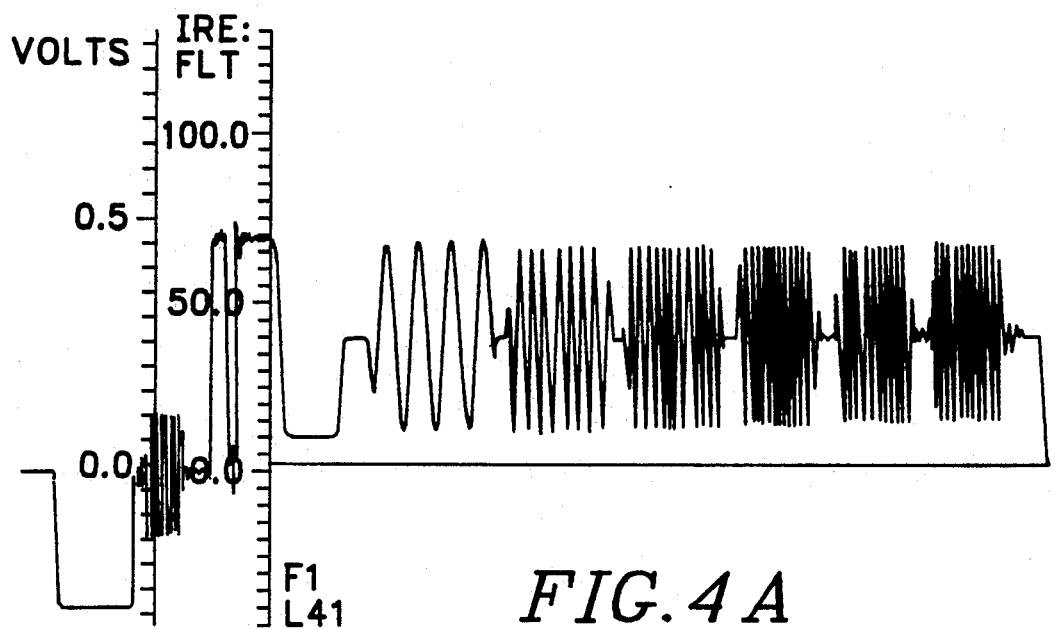
FIGS. 4a, 4b and 4c illustrate the response of a codec tested according to the present invention.
Figure 4B:
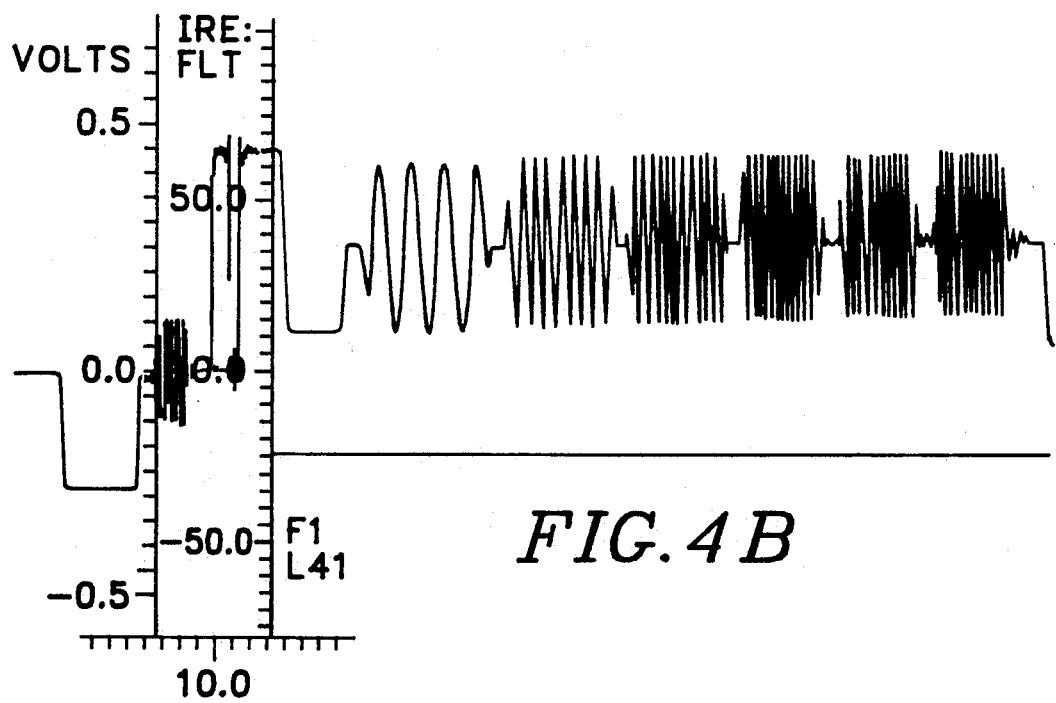
Figure 4C:
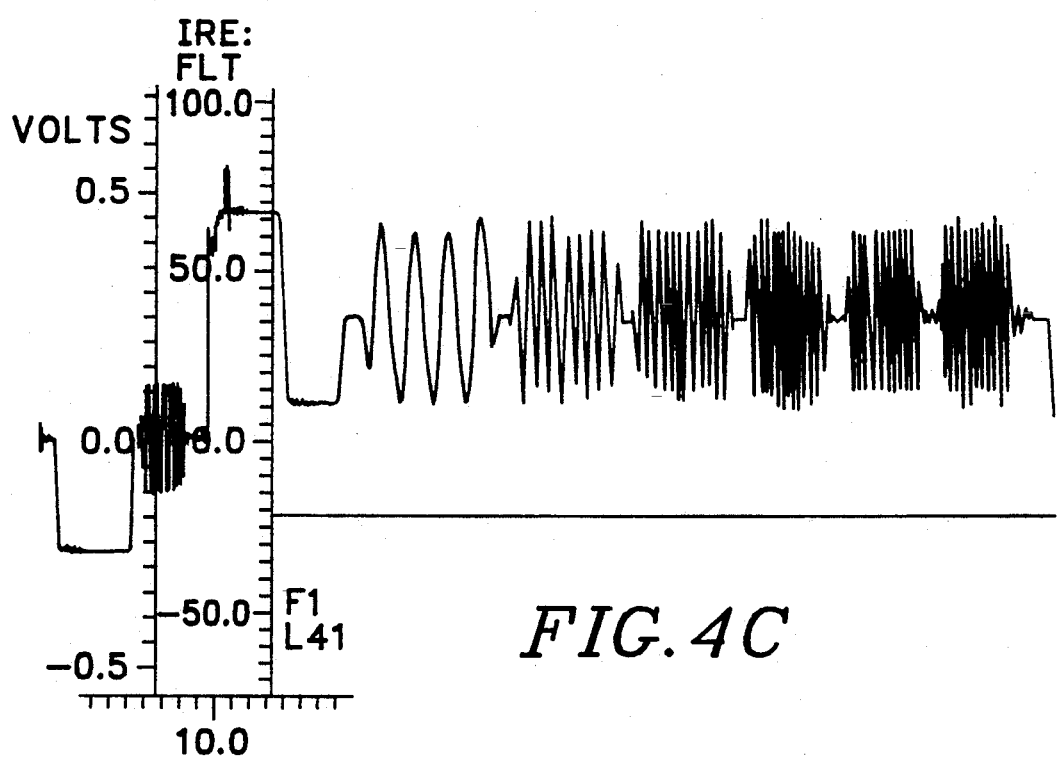

FIGS. 4a, 4b and 4c show examples of the display of the foreground component on a VM 700 where the foreground component is a multiburst signal inserted into the background component on line 41 every n fields, where n is greater than the temporal neighborhood of the codec being tested. Where the background noise is at −60 dB, as shown in FIG. 4a, no significant distortion of the multiburst packets is apparent. Even when the background component noise level is increased to −30 dB as shown in FIG. 4b, the codec still passes the foreground component with little apparent distortion. However when the background component noise level is increased to −20 dB, i.e., passes a complexity threshold for the codec as shown in FIG. 5, the background picture complexity overloads the codec capacity and significant degradation of the foreground component is apparent, as shown in FIG. 4c. Therefore by varying the complexity of the background component, the complexity threshold of the codec may be determined and the codec characterized accordingly.

Figure 6A:
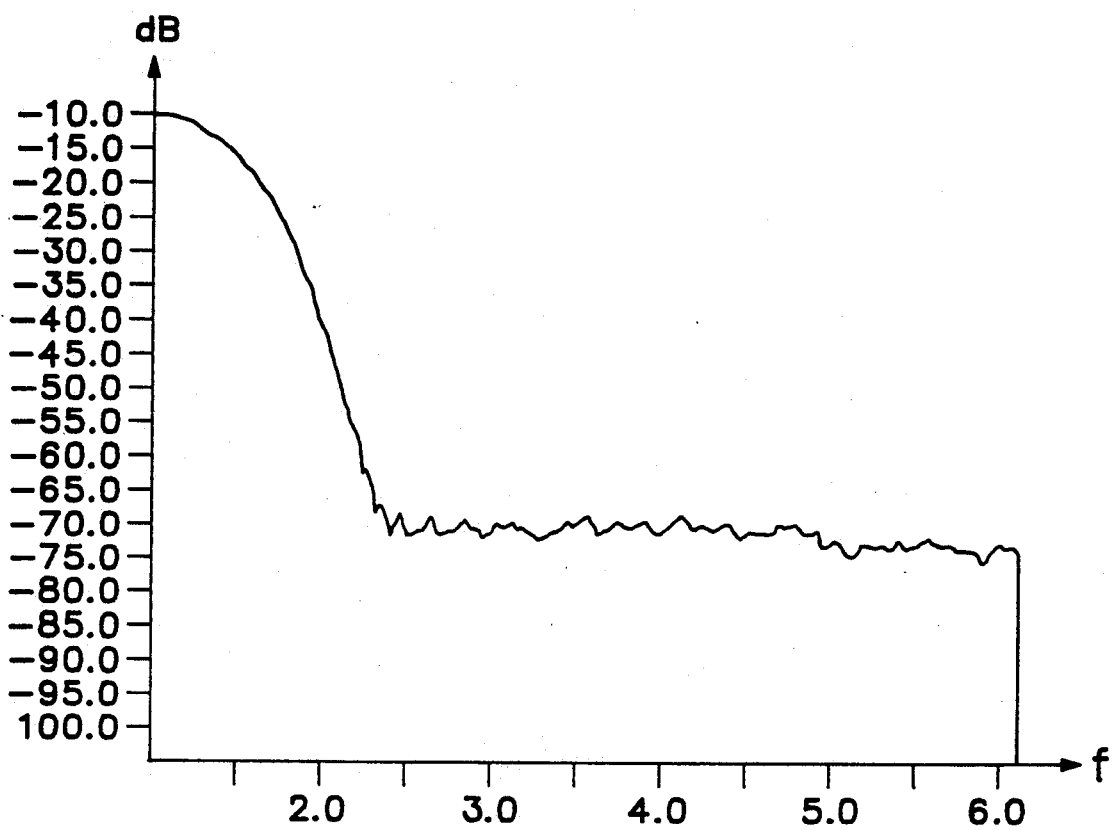
FIGS. 6a, 6b and 6c illustrate the spectral response of a codec tested according to the present invention.
Figure 6B:
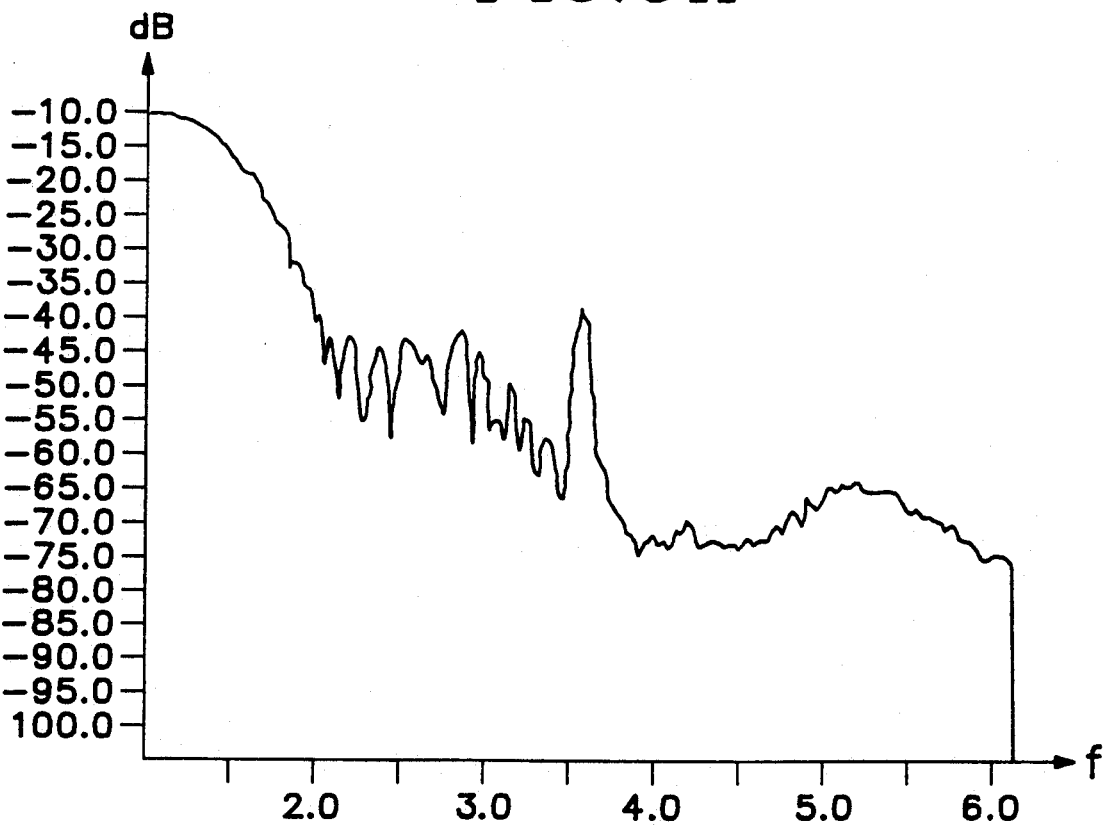
Figure 6C:
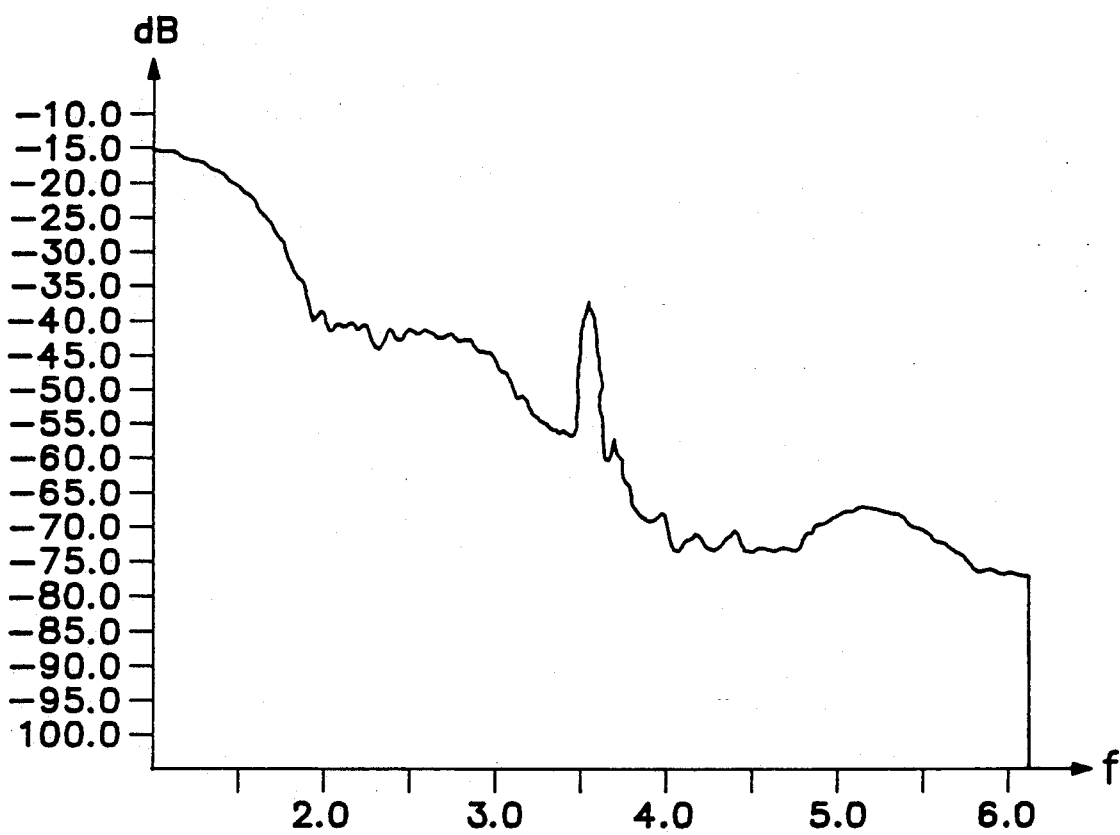

Another indicator of codec performance may be provided by providing a time or frequency domain display of a section through a zone plate. The time domain display of a selected horizontal line of a circular zone plate shows a frequency sweep. Due to waveform distortions in the codec it is difficult to separate the desired fundamental component from undesired distortion components. If the desired horizontal line is digitized and stored, a fast Fourier Transform (FFT) shows the various spectral components present. Knowing which spectral components are present in the original test signal, distortion components may be interpreted as a signature characteristic of the codec under test. As shown in FIG. 6a a spectral display for a circular zone plate signal using a VM 700 is shown from the output of the test signal generator 12. The signal has energy out to about 2.5 MHz. The same stationary zone plate test signal spectral display is shown in FIG. 6b after passing through the codec showing a unique spectral distortion pattern for the codec. Adding a temporal motion component to the zone plate signal changes the spectral distortion pattern as shown in FIG. 6c. Each zone plate signal and each analysis axis shows a different characteristic distortion since the display may be based on samples taken along other axes of the zone plate signal. Once a known codec is so characterized, then variations from the expected spectral displays in response to the same test signal indicate anomalies in the codec.

Therefore the present invention provides a three-dimensional test signal for a video codec that uses a background signal of varying complexity with an inserted foreground signal at specified pixels, lines, fields and/or frames to more accurately characterize the performance of the video codec.

What is claimed is:

1. A method of testing a video device comprising the steps of:
    generating a three-dimensional test signal having a background component of variable complexity and a known foreground component inserted into the background component at a known location within a program picture represented by the three-dimensional test signal;
    applying the three-dimensional test signal to the video device; and
    measuring the known foreground component with a measurement instrument.

2. A method as recited in claim 1 wherein the generating step includes the step of inserting the known foreground component into the background component in an arbitrary three-dimensional region along a combination of one or more of the horizontal, vertical and temporal axes.

3. A method as recited in claim 1 wherein the generating step includes the step of generating a noise signal as the background component.

4. A method as recited in claim 1 wherein the generating step includes the step of selecting an amplitude for the background component, the magnitude of the amplitude determining the complexity of the background component.

5. A method as recited in claim 1 wherein the generating step includes the step of selecting a bandwidth for the background component, the bandwidth determining the complexity of the background component.

6. A method as recited in claim 1 wherein the generating step includes the step of generating the background component with controlled correlation in an arbitrary three-dimensional region along a combination of one or more of the horizontal, vertical and temporal axes.

7. A method as recited in claim 1 wherein the applying step includes the step of triggering the measurement instrument only during the period when the foreground component is present in the three-dimensional signal.

8. A method as recited in claim 1 wherein the measuring step includes the step of averaging the three-dimensional signal over a plurality of repetitions to reject the background component while retaining the foreground component.

9. A method as recited in claim 1 wherein the generating step includes the step of generating a zone plate signal as the background component.

10. A method as recited in claim 9 wherein the measuring step includes the step of presenting a spectral display of the zone plate signal from the video device to characterize the performance of the video device.

* * * * *